(12) United States Patent
Burt et al.

(10) Patent No.: US 11,832,629 B2
(45) Date of Patent: Dec. 5, 2023

(54) TANDEM EVAPORATION-DRYING METHODS AND SYSTEMS FOR MAKING POWDERED MILK-DERIVED PRODUCTS

(71) Applicant: Leprino Foods Company, Denver, CO (US)

(72) Inventors: Neill Burt, Denver, CO (US); Mark Cramer, Parker, CO (US); Jiancai Li, Englewood, CO (US); Richard Merrill, Highlands Ranch, CO (US)

(73) Assignee: Leprino Foods Company, Denver, CO (US)

( * ) Notice: Subject to any disclaimer, the term of this patent is extended or adjusted under 35 U.S.C. 154(b) by 121 days.

(21) Appl. No.: 16/945,304

(22) Filed: Jul. 31, 2020

(65) Prior Publication Data
US 2021/0106016 A1   Apr. 15, 2021

Related U.S. Application Data

(60) Provisional application No. 62/914,155, filed on Oct. 11, 2019.

(51) Int. Cl.
| | | |
|---|---|---|
| *B01D 1/18* | (2006.01) | |
| *A23C 1/04* | (2006.01) | |
| *A23C 1/12* | (2006.01) | |
| *A23C 1/14* | (2006.01) | |

(Continued)

(52) U.S. Cl.
CPC ............ *A23C 1/12* (2013.01); *A23C 1/01* (2013.01); *A23C 1/04* (2013.01); *A23C 9/16* (2013.01);

(Continued)

(58) Field of Classification Search
CPC .... B01D 1/18; B01D 1/16; B01D 1/20; A23C 9/16; A23C 1/01; A23C 1/03; A23C 1/04; A23C 1/045; A23C 1/05
See application file for complete search history.

(56) References Cited

U.S. PATENT DOCUMENTS 3,038,533 A * 6/1962 Comings ............... B01D 1/18
 159/48.1
3,185,580 A * 5/1965 Hanrahan .............. A23C 1/04
 159/24.2

(Continued)

FOREIGN PATENT DOCUMENTS

| AU | 642256 B2 | 10/1993 | |
|---|---|---|---|
| WO | WO-2009061571 A1 * | 5/2009 | ............ A23C 1/04 |
| WO | WO-2016102501 A1 * | 6/2016 | ............ A23C 1/04 |

OTHER PUBLICATIONS

Jonathan J. O'Sullivan, Eve-Anne Norwood, James A. O'Mahony, Alan L. Kelly, "Atomisation technologies used in spray drying in the dairy industry: A review", Journal of Food Engineering, vol. 243, 2019, pp. 57-69, ISSN 0260-8774, https://doi.org/10.1016/j.jfoodeng.2018.08.027.*

(Continued)

*Primary Examiner* — Jonathan Luke Pilcher
(74) *Attorney, Agent, or Firm* — Kilpatrick Townsend & Stockton LLP (57) ABSTRACT

Methods of making a powdered milk product are described. The methods may include providing an aqueous milk-sourced mixture, and evaporating water from the aqueous milk-sourced mixture to produce an evaporated milk-sourced mixture having a total solids concentration of 35 wt. % or more. The evaporated milk-sourced mixture may be dried to form the powdered milk product, which may have less than 6 wt. % water. Systems for making the milk powdered product are also described. The systems may include an evaporator to evaporate water from a supply of a milk-sourced mixture to form an evaporated milk-sourced mixture. They may also include a dryer to dry the evaporated milk-sourced mixture and atomize it into the powdered milk product.

14 Claims, 6 Drawing Sheets

(51) Int. Cl.
    A23C 9/18      (2006.01)
    A23C 1/01      (2006.01)
    B01D 1/24      (2006.01)
    B01D 1/14      (2006.01)
    B01D 1/22      (2006.01)
    A23C 9/16      (2006.01)

(52) U.S. Cl.
    CPC ................ *A23C 9/18* (2013.01); *B01D 1/14* (2013.01); *B01D 1/222* (2013.01); *B01D 1/24* (2013.01); *B01D 1/18* (2013.01)

(56) References Cited

U.S. PATENT DOCUMENTS

| | | | | |
|---|---|---|---|---|
| 5,397,589 | A | 3/1995 | Korte et al. | |
| 7,157,108 | B2 | 1/2007 | Bhaskar et al. | |
| 2004/0191381 | A1* | 9/2004 | Getler | A23C 1/04 426/520 |
| 2004/0208967 | A1* | 10/2004 | Getler | A23C 21/00 426/492 |
| 2008/0230051 | A1* | 9/2008 | Bonke | B01D 9/005 127/16 |
| 2015/0064332 | A1* | 3/2015 | Glenn, III | A23C 9/1422 426/586 |
| 2015/0257402 | A1* | 9/2015 | Sipahioglu | A23C 1/16 426/588 |
| 2017/0164631 | A1* | 6/2017 | Ray | A23C 21/023 |
| 2018/0084819 | A1* | 3/2018 | Bleiel | A23L 29/238 |

OTHER PUBLICATIONS

Tamime, A. Y .. (2009). Dairy Powders and Concentrated Products—4.2.1.6 Thermal Vapour Recompression. John Wiley & Sons. Retrieved from https://app.knovel.com/hotlink/pdf/id:kt011NB8QU/dairy-powders-concentrated/thermal-vapour-recompression.*

"Milk composition", ESA, https://www.groupe-esa.com/ladmec/bricks_modules/brick02/co/ZBO_Brick02_2.html.*

Pugliese A, Cabassi G, Chiavaro E, Paciulli M, Carini E, Mucchetti G. Physical characterization of whole and skim dried milk powders. J Food Sci Technol. Oct. 2017;54(11):3433-3442. doi: 10.1007/s13197-017-2795-1. Epub Sep. 13, 2017. PMID: 29051638; PMCID: PMC5629152.*

J. J. Tuohy, Irish Journal of Food Science and Technology, vol. 13, No. 2 (1989), pp. 141-152 (12 pages), https://www.jstor.org/stable/25619580.*

International Application No. PCT/US2020/054385 Received and Invitaion to Pay Additional Fees dated Dec. 8, 2020, 2 pages.

Tanguy, et al., "Concentration of Dairy Products Using a Thin Film Spinning Cone Evaporator", Journal of Food Engineering, vol. 166, pp. 356-363, Dec. 2015.

"Galacto-Oligosaccharides" Datasheet [online], Sep. 17, 2019, 5 pages. Available Online at https://www.rxlist.com/galacto-oligosaccharides/supplements.htm.

Glover; W.B. "Selecting Evaporators for Process Applications", Chemical Engineering Progress, vol. 100, No. 12, Dec. 2003, pp. 26-33. Available Online at https://Icicorp.com/en/articles/selecting-evaporators-for-process-applications.

Santos, et al, "Spray Drying: An Overview", Biomaterials, Dec. 20, 2017, 28 pages. Available Online at https://www.intechopen.com/books/biomaterials-physics-and-chemistry-new-edition/spray-drying-an-overview.

Teferra; Tadesse F. "Chapter 3—Engineering Properties of Food Materials" Handbook of Farm, Dairy and Food Machinery Engineering (Third Edition), Jul. 2019, abstract submitted.

International Application No. PCT/US2020/054385 received an International Search Report and Written Opinion dated Mar. 1, 2021, 13 pages.

* cited by examiner

TANDEM EVAPORATION-DRYING METHODS AND SYSTEMS FOR MAKING POWDERED MILK-DERIVED PRODUCTS

CROSS-REFERENCE TO RELATED APPLICATIONS

This application claims the benefit of U.S. Provisional Application No. 62/914,155, filed Oct. 11, 2019, the entire contents of which are herein incorporated by reference.

BACKGROUND OF THE INVENTION

Powdered milk-derived products such as milk proteins, aldobionic products, and galactooligosaccharides, have become a major source of ingredients in a wide variety of foods and beverages. Milk-derived proteins, for example, have become a major source of protein-fortification in nutrition bars and sports drinks. As consumer demand for these protein-fortified products increase, so has the demand for higher proteins that have reduced levels of ancillary milk nutrients such as milk sugars and milkfats. The protein purity levels found in dry milk powders, including non-fat dry milk powders that have milkfat levels below 0.5 wt. %, are not high enough for many protein-fortified nutrition products. Milk protein concentrates having protein concentrations of at least 40 wt. % are often required. An increasing number of products incorporate milk protein isolates having concentrations of 90 wt. % or more.

The increased demand for higher-purity milk proteins has created new challenges for commercial-scale production of these macronutrients. Conventional methods of evaporating and drying milk to make lower-purity milk powders have to be modified in order to make the higher-purity protein powders. The milk sugars and fats in average cows' milk allows it to be highly concentrated using inexpensive techniques like falling film evaporation. The evaporated milk can be dried using conventional spray drying. The proteins in the powdered milk are diluted by a large fraction of milk sugars and minerals, and a significant amount of protein denaturation is tolerated. In contrast, milk protein concentrates and isolates have most of the milk sugars and minerals removed, and have a tendency to become very viscous and form gels when heated during concentration steps. Unclogging the gels from evaporation and drying equipment translates into long and frequent downtimes for the equipment used to make milk protein powders.

One way to slow equipment clogging by the gelling milk proteins is to introduce surfactants and other kinds of viscosity reducers to the starting milk-sourced mixture. For example, small molecule salts like sodium chloride can be used to create electrostatic repulsion between adjacent protein molecules that offset their attractive physical forces like van der Waals forces. Unfortunately, sodium chloride (i.e., table salt) can dramatically change the taste of the milk proteins. It also increases the sodium levels in the protein-fortified product, reducing its health and nutritional quality.

Another way to hinder the gelation of the concentrated milk proteins is to hydrolyze them into smaller protein units. There are a wide variety of protease enzymes that enzymatically hydrolyze milk proteins into smaller pieces called protein hydrolysates that are significantly less viscous than intact, native milk proteins. Unfortunately, enzymatic protein hydrolysis requires carefully controlled conditions to prevent the formation of small hydrolysate units that can taste bitter. The protein hydrolysates can also have different nutritional characteristics than native milk proteins.

The challenges with concentrating and drying milk-derived products are not limited to milk proteins. Other ingredients derived from milk, such as lactobionates, lactobionic acid, and galacto-oligosaccharides, among others, create problems for conventional concentrating and drying systems. For example, these milk-carbohydrate derived ingredients can include hygroscopic compounds like minerals salts, organic acids, and monosaccharides that more tightly bond to water and do not readily give up moisture when attempting to produce a dried milk-derived product. In many instances, the drying concentrate becomes sticky and tends to clog conventional spray drying nozzles.

Because of the deficiencies with these and other alternative methods of concentrating milk-sourced mixtures and forming milk-derived powders, there is still a need for methods and systems of efficiently producing these powders. Ideally, the powdered milk-derived products consist of intact ingredients which have not been significantly altered, hydrolyzed, or adulterated by concentrating and drying techniques used to make them. Exemplary methods and systems that address these issues, among others, are described herein.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

BRIEF SUMMARY OF THE INVENTION

Methods and systems are described for efficiently converting aqueous milk-sourced mixtures into powdered milk-derived products. The methods include an evaporation stage to remove water from the aqueous milk-sourced mixture by evaporation, and a drying stage to remove more water from the evaporated mixture by drying and atomizing to form the powdered milk product. The evaporation stage may involve the use of an evaporation technique, chosen from a thin-film evaporation, wiped-film evaporation, and spinning cone evaporation, to remove water from the starting aqueous mixture. The drying stage may involve the use of hot gas atomization drying to atomize and dry the wet solids from the evaporated mixture produced by the evaporation stage. The combination of these evaporation techniques and hot gas atomization drying permits more water to be removed during the evaporation stage than is possible using conventional falling film evaporation. Since these evaporation techniques are more energy efficient for removing water from milk solids than drying, shifting a greater fraction of the water removal to these evaporation techniques results in increased energy efficiencies for the overall method. For example, the present methods and systems may use at least 5% less energy (e.g., 5% to 62% less energy, 6% to 59% less energy) than a conventional method that includes falling film evaporation and/or spray drying.

The present methods and systems are well-suited for powdered milk-derived products such as purified milk proteins that gel during concentration in aqueous mixtures. Exemplary powdered milk proteins include whey protein concentrates (WPCs) of 25-90% by dry weight, whey protein isolates (WPIs) of 90-99% by dry weight, whey protein phospholipid concentrates of 60% or more by dry weight, micellar casein of 80% or more by dry weight, lactoferrin of 80% or more by dry weight, alpha-lactalbumin of 70% or more by dry weight, beta-lactogloublin of 80% or more by dry weight, immunoglobulins of 80% or more by dry weight, and enzymatically treated non-fat dry milk (reduced lactose NFDM), among other milk proteins.

The present methods and system are also well-suited for powdered milk-derived products derived from milk sugars such as aldobionate products like lactobionic acid and lactobionate salts, as well as galactooligosaccharides. Exemplary powdered milk sugar-derived products include lactobionic acid concentrated to 55% or more by dry weight, lactobionate salts (e.g., calcium lactobionate, potassium lactobionate, ammonium lactobionate, sodium lactobionate, zinc lactobionate, and/or iron lactobionate) concentrated to 30% or more by dry weight, and galactooligosaccharides concentrated to 40% or more by dry weight. The powdered milk sugar-derived products may have lactose concentration of 25 wt. % or less, 20 wt. % or less, 15 wt. % or less, 10 wt. % or less, 5 wt. % or less, 2 wt. % or less, and 1 wt. % or less. They may have lactose concentration ranges of 25 wt. % to 1 wt. %, 20 wt. % to 1 wt. %, 15 wt. % to 1 wt. %, 10 wt. % to 1 wt. %, 5 wt. % to 1 wt. % and 2 wt. % to 1 wt. %, among other ranges. The powdered milk sugar-derived products may have protein concentrations of 20 wt. % or less, 15 wt. % or less, 10 wt. % or less, 5 wt. % or less, 2 wt. % or less, and 1 wt. % or less.

Embodiments include methods of making a powdered milk product. The method includes providing an aqueous milk-sourced mixture, and evaporating water from the aqueous milk-sourced mixture to produce an evaporated milk-sourced mixture having a total solids concentration of 35 wt. % or more and a viscosity of 300 cP or more. The evaporated milk-sourced mixture is then dried to form the powdered milk product, which has less than 6 wt. % water. As noted above, the evaporation stage may be using thin-film evaporation, wiped-film evaporation, or spinning cone evaporation, and the drying stage may be done using hot gas atomization drying.

Embodiments also include systems for making a powdered milk product. The systems may include a supply of milk-sourced mixture, and an evaporator having an opening coupled to the supply of the milk-sourced mixture and an outlet for an evaporated milk-sourced mixture. The evaporator evaporates water from the milk-sourced mixture to form the evaporated milk-sourced mixture. The system may further include a dryer having an inlet to receive the evaporated milk-sourced mixture from the evaporator and one or more conduits that terminate in a drying chamber. The evaporated milk-sourced mixture passes through the conduits into the drying chamber, where the evaporated milk-sourced mixture is dried and atomized to form the powdered milk-derived product.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

Systems and methods of generating powdered milk-derived products are described that use a combination of evaporation and drying to remove water from an aqueous milk-sourced mixture. Exemplary systems and methods include thin-film, wiped-film, or spinning cone evaporation to concentrate an initial aqueous milk-sourced mixture to at least 35 wt. % total solids, and drying (e.g., hot gas atomization drying) to convert the concentrated milk-sourced mixture or slurry into a powdered milk product with at least 94 wt. % total solids (i.e., a moisture level of 6 wt. % or less). The tandem combination of evaporation and drying enables production of powdered milk-derived products with significantly higher levels of energy efficiency than either evaporation or drying alone. Additional details about exemplary systems and methods will now be described.

Exemplary Evaporator and Dryer Systems

Figure 1:
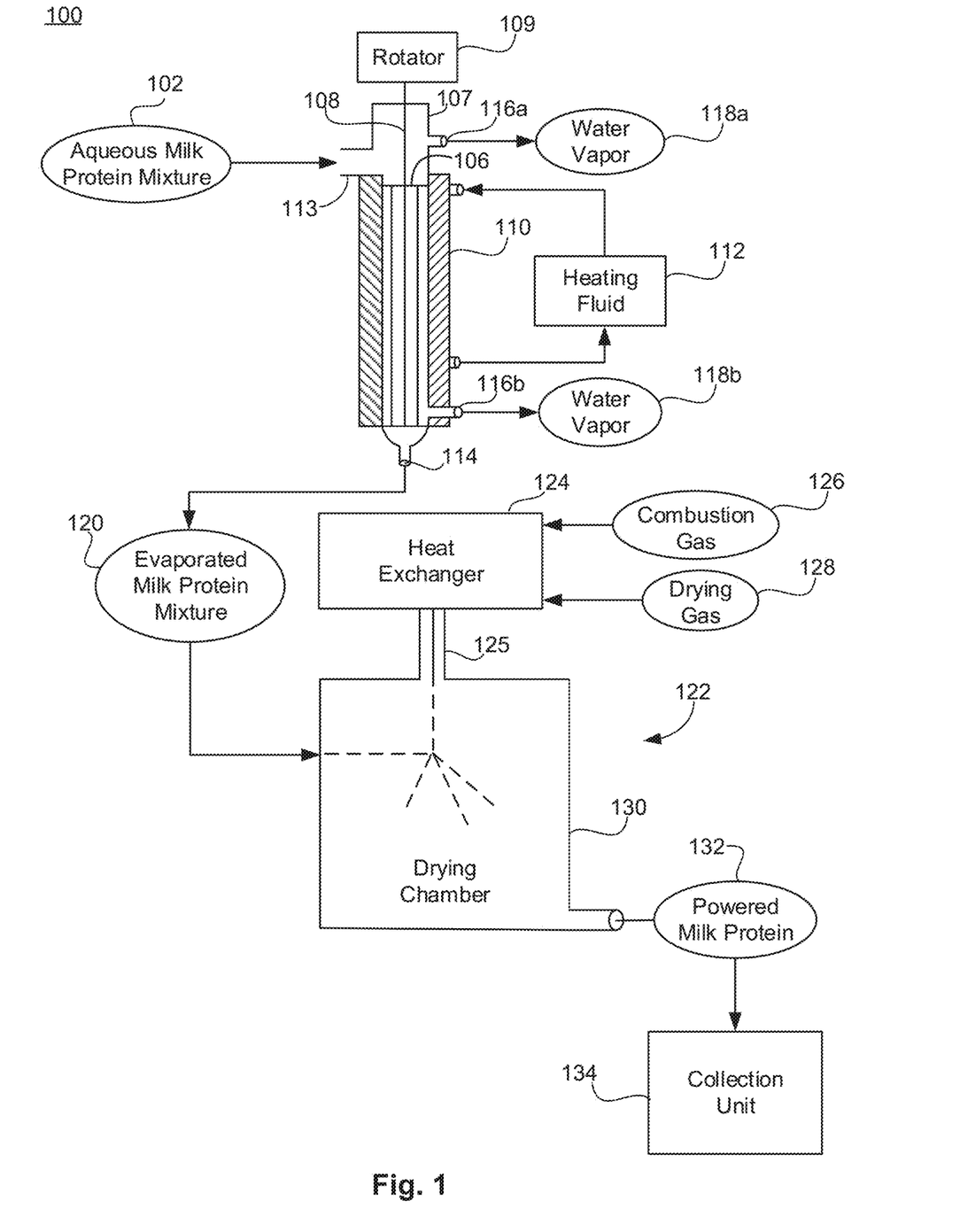
FIG. 1 is a simplified schematic of an evaporator and dryer system to generate powdered milk-derived products according to selected embodiments.

FIG. 1 shows selected parts of a system 100 to make a powdered milk product from an aqueous milk-sourced mixture. The system 100 includes a thin-film evaporator 104 that is operable to receive an initial aqueous milk-sourced mixture from a supply 102 of the mixture. The thin-film evaporator 104 may be an agitated thin film evaporator having one or more central rotating blades or fins 106 surrounded by a container body 107. A proximate edge of each blade 106 may be attached to a rotatable shaft 108 that is actuated by a rotator 109, while a distal edge of the blade makes near contact with an interior wall of the surrounding container body 107. A heating element is in thermal contact with the interior wall of the container body 107 to raise the temperature of the wall to a temperature that facilitates the rapid evaporation of water from the aqueous milk-sourced mixture spread against the interior wall. Exemplary heating elements include a heating jacket or coil 110 that is supplied with a heating medium 112 to maintain the elevated temperature of the interior wall. Exemplary heating elements also include heating tape wrapped around the containing and operable to raise the temperature of the container through the flow of an electric current through the heating tape (not shown).

The thin-film evaporator 104 also includes a top inlet 113 to receive the initial aqueous milk-sourced mixture from the supply 102 of the mixture, and a bottom outlet 114 through which the evaporated mixture 120 exits the thin-film evaporator 104. Additional openings (116a-b) with access to the container's interior may be present to permit the escape of the evaporated water (118a-b) from the aqueous milk-sourced mixture. The openings (116a-b) may be adapted to form a connection with a pump (not shown) that pulls a vacuum on the container's interior to remove water vapor at a faster rate and facilitate more rapid evaporation from the aqueous milk-sourced mixture.

In operation, the thin-film evaporator 104 receives the unconcentrated aqueous milk-sourced mixture 102 through the inlet 113 at the top of the container and spreads it into a thin film around the heated interior wall of the container 107 using the rotating blades 106 actuated by through the rotatable shaft 108 by the rotator 109. Gravity helps pull down the thin film to the bottom of the container while the solids in the milk-sourced mixture become increasingly concentrated with the evaporation of water. The combination of the rotating blades 106 and pull of gravity spread the aqueous mixture fed through the top inlet 113 into a thin film with a significantly increased surface area to volume ratio that increases the evaporation rate. The rotating blades 106 also prevent buildup of gels and particulates from the mixture on the interior heated wall of the container 107.

The thin film of the evaporating aqueous milk-sourced mixture eventually reaches the bottom outlet of the container and exits through bottom outlet 114. In some embodiments, the bottom outlet 114 may be coupled to a pump (not shown) that helps draw the evaporated milk-sourced mixture 120 through the bottom outlet 114 and out of the container 107. The bottom outlet 114 may also be an outlet for at least a portion of the evaporated water that is released from the evaporating aqueous milk-sourced mixture.

The system 100 further includes a hot gas atomization dryer 122 operable to receive the evaporated milk-sourced mixture 120 from the thin-film evaporator 104. The hot gas atomization dryer 122 may include a source for combustion gas 126 and a source of atomization and drying gas 128 being supplied to a heat exchanger 124. The source of combustion gas 126 may include a mixture of (i) an oxidizing gas and (ii) a fuel gas. The oxidizing gas may be air and the fuel gas may include hydrocarbons such as methane, ethane, propane, and/or butane, among others. The hot gas atomization dryer 122 may include a heat exchanger 124 for heating the atomization and drying gas. The atomization and drying gas may be heated directly by an electric heater or indirectly by a combustion gas 126.

In some embodiments, the combustion gas 126 is ignited before reaching the heat exchanger 124, while in other embodiments the combustion gas 126 is ignited during or after entering the heat exchanger 124. The ignition of the combustion gas creates combustion gas products like carbon dioxide ($CO_2$) and water ($H_2O$), as well as the release of thermal energy. Depending on the ratios of the oxidizing gas to the fuel gas in the combustion gas, incomplete combustion may occur and the combustion gas products may further include carbon monoxide (CO), and well as partially combusted hydrocarbons and uncombusted hydrocarbons. The intense heat of combustion may also oxidize some of the nitrogen ($N_2$) when air is used as the oxidizing gas to create nitrite and nitrate compounds in the combustion gas products. A chemical sensor (not shown) may be used to monitor the levels of carbon monoxide, hydrocarbons, and/or other gases to monitor changes in the combustion efficiency of the combustion gas 126. The sensor may be electrically coupled to an automatic monitoring system that provides information to a system operator on the levels of combustion and alerts the operator when a level has climbed above a preset threshold level that indicates problems with the combustion.

The thermal energy released from the heater or the ignition of the combustion gas 126 heats the atomization and drying gas 128 in the heat exchanger 124. The atomization and drying gas 128 is heated to temperatures ranging from 200° F. to 1500° F. For example, the heated atomization and drying gas 128 may be heated to temperatures of 200° F.-300° F.; 300° F.-400° F.; 400° F.-500° F.; 500° F.-600° F.; 600° F.-700° F.; 700° F.-800° F.; 800° F.-900° F.; 900° F.-1000° F.; 1000° F.-1100° F.; 1100° F.-1200° F.; 1200° F.-1300° F.; 1300° F.-1400° F.; and 1400° F.-1500° F.; among other temperature ranges. The ignited combustion gas may exit the heat exchanger 124 through a vent (not shown) that removes them from system 100. In some embodiments, the ignited combustion gas is still well above ambient temperature (e.g., 68° F.) and still contains sufficient levels of oxygen ($O_2$) to be used as (or mixed with) new combustion gas being supplied to the heat exchanger 124. Thus, in some embodiments the ignited combustion gas may be recycled back into new combustion gas 126 that is supplied to the heat exchanger 124.

The heated atomization and drying gas emerges from the heat exchanger 124 and is directed into a tailpipe 125. The tailpipe 125 has a distal opening through which the heated atomization and drying gas exits into a drying chamber 130 where the gas makes contact with a feed of the evaporated aqueous milk-sourced mixture. FIG. 1 shows the wet feed of evaporated aqueous milk-sourced mixture being provided from the thin-film evaporator 104 to the hot gas atomization dryer's drying chamber 130 via a feed conduit. In the embodiment shown, the heated atomization and drying gas and feed of evaporated aqueous milk-sourced mixture make contact to produce a dry, atomized powdered feed in the drying chamber 130.

The temperature of the heated atomization and drying gas 128 at the point of contact with the wet feed may range from about 200° F. to about 1500° F. Exemplary temperature ranges also include 200-250° F.; 200-225° F.; 200-500° F.; 500-1000° F.; 500-1500° F.; 1000-1500° F.; etc. In some embodiments the heated atomization and drying gas traveling from the heat exchanger 124 to the drying chamber 130 experiences a significant drop in temperature (e.g., 100-1300° F.). For example, the initial atomization and drying gas may be supplied to the heat exchanger 124 at ambient temperature (e.g., 60-80° F.) and be raised up to 1500° F. by the heat from the heater or the ignited combustion gas before falling back down to 170° F. inside the drying chamber 130.

The wet feed of evaporated aqueous milk-sourced mixture may be supplied to the feed conduit under pressure through the action of a feed pump (not shown) coupled to the thin-film evaporator 104 at the wet feed input to the drying chamber 130. An exemplary feed pump may be a mechanical pump designed for food grade operations. The feed pump may help supply the wet feed to the drying chamber 130 at pressures of up to 5000 psig. For example, the wet feed may be supplied at pressures of 20-5000 psig; 100-5000 psig; 20-4000 psig; 20-3000 psig; 20-2000 psig; 20-1000 psig; 20-500 psig; 20-250 psig; etc.

The powdered feed 132 (e.g., powdered milk-derived protein) may be collected by a collection unit 134. In some embodiments, the collector may include a conveyor belt (not shown) that transports the collected powdered feed to a container for storage and/or shipment as a final powdered product. In other embodiments, the powdered feed may be collected directly into containers or vacuumed into collection bags at the collection unit 134.

Exemplary Evaporation and Drying Methods

Figure 2:
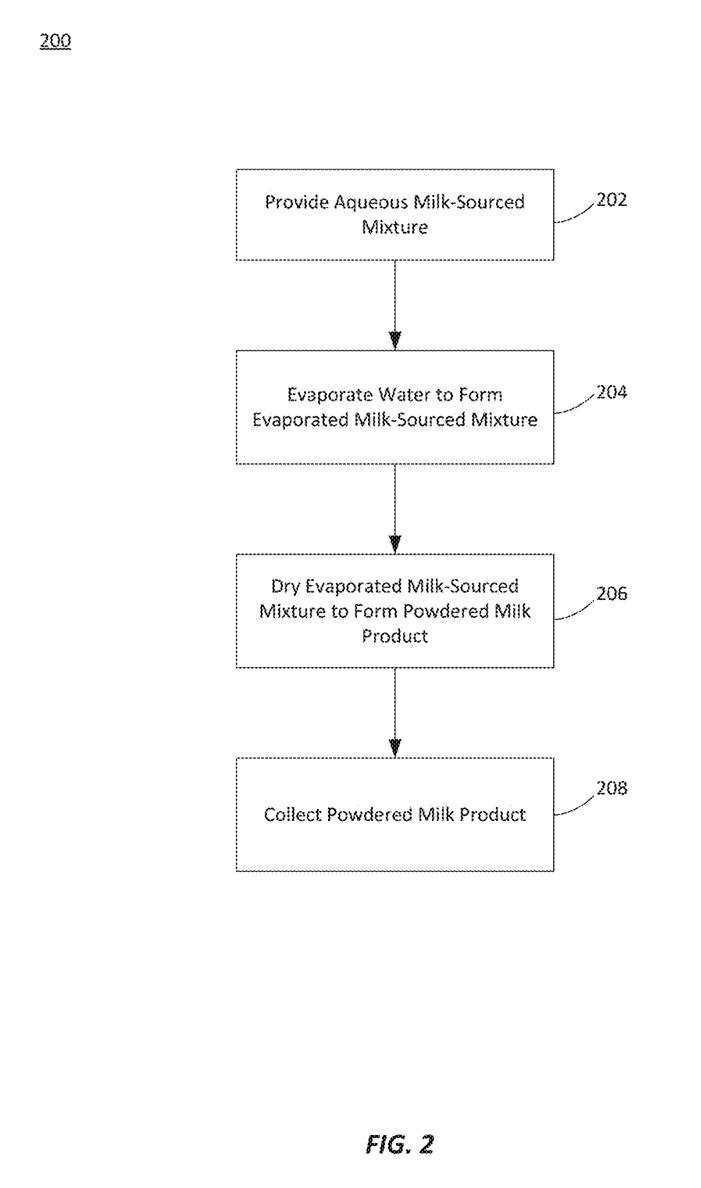
FIG. 2 is a flowchart illustrating selected steps in an evaporation and drying method to make powdered milk-derived products according to selected embodiments.
Figure 3:
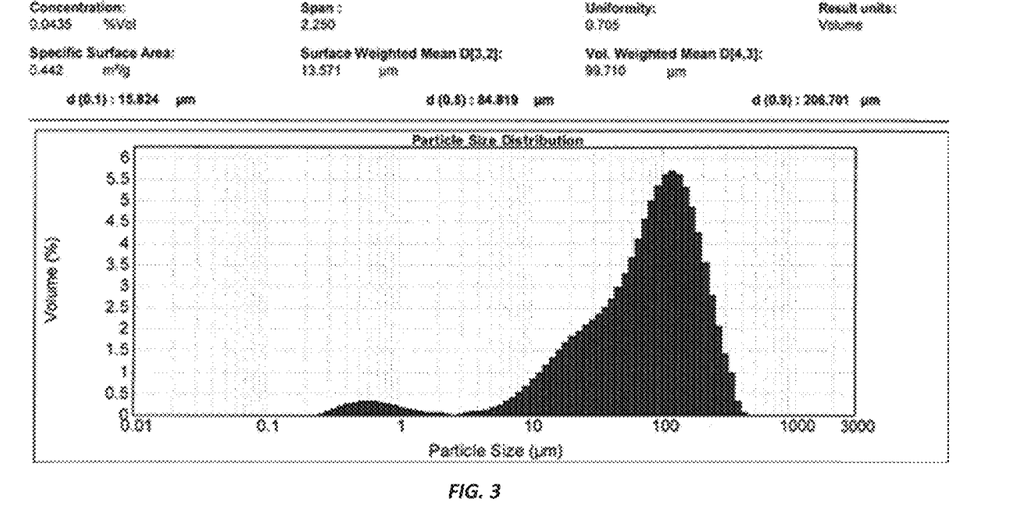
FIG. 3 is a graph showing a particle size distribution of WPC-80 powder made using a conventional spray drying system.
Figure 4:
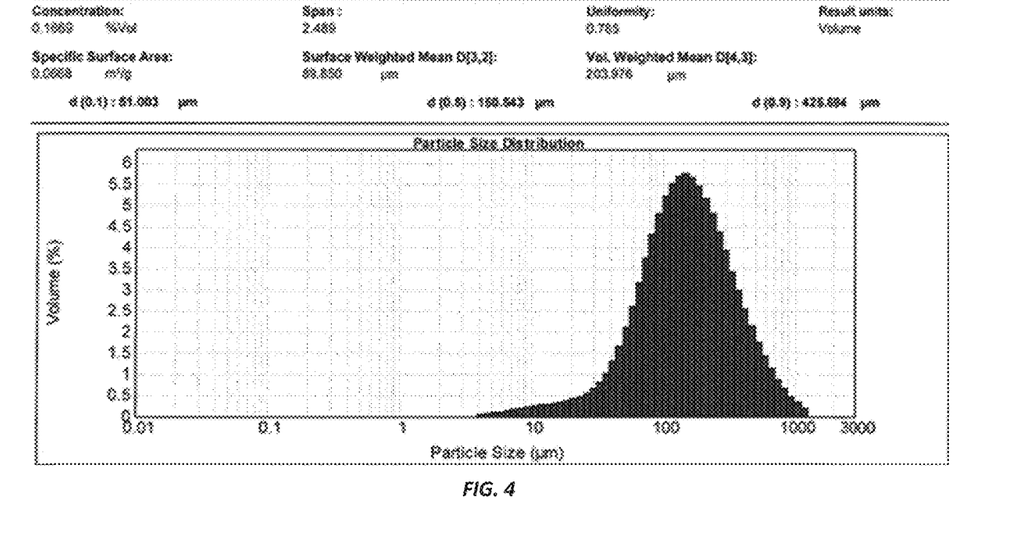
FIG. 4 is a graph showing a particle size distribution of WPC-80 powder made using a TFE/HGAD system.
Figure 5:
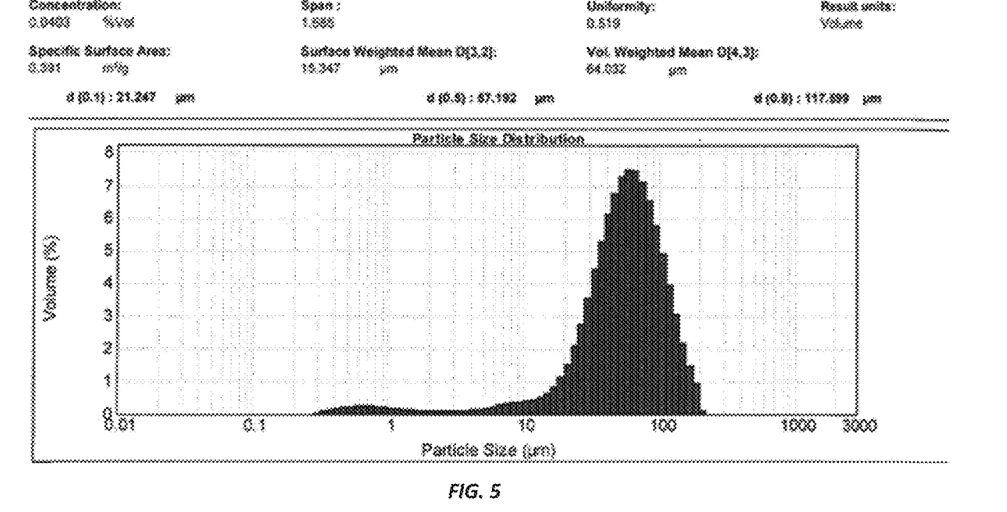
FIG. 5 is a graph showing a particle size distribution of reduced-lactose NFDM powder made using a conventional spray drying system.
Figure 6:
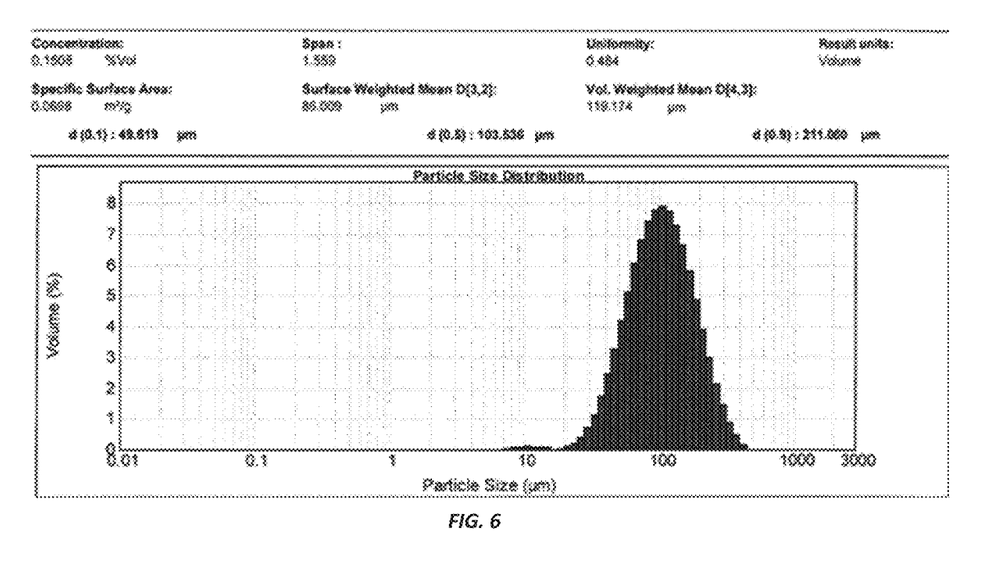
FIG. 6 is a graph showing a particle size distribution of reduced-lactose NFDM powder made using a TFE/HGAD system.
Figure 7A:
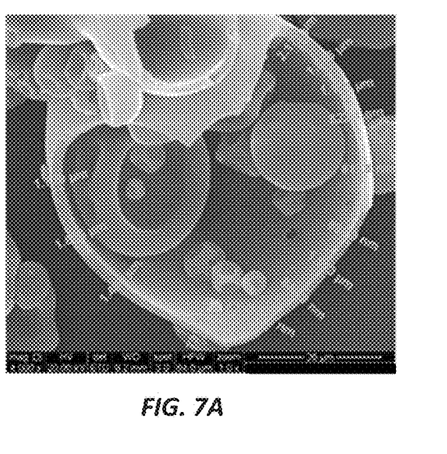
FIGS. 7A-C are SEM images of fractured WPC80 particles made according to conventional spray drying methods.
Figure 7B:
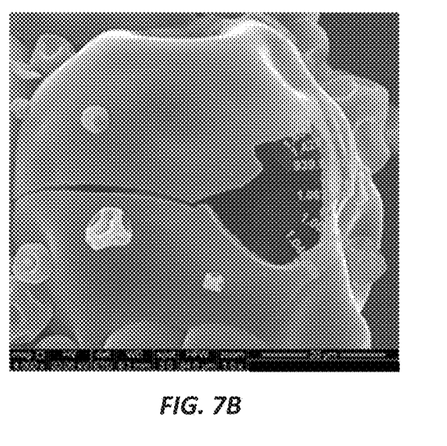
Figure 7C:
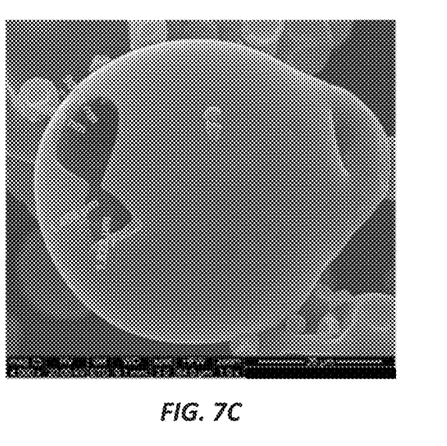

FIG. 2 is a flowchart showing selected steps in a method 200 of making a powdered milk product. The method 200 includes providing an aqueous milk-sourced mixture 202. The aqueous milk-sourced mixture may include milk protein mixtures or milk-sugar derived mixtures. Exemplary milk protein mixtures include milk protein concentrates, milk protein isolates, whey protein concentrates, whey protein isolates, micellar casein, lactoferrin, alpha-lactalbumin, beta-lactogloublin, immunoglobulins, whey protein phospholipid concentrates, and reduced-lactose non-fat milk. Exemplary milk-sugar derived protein mixtures include aldobionate products like lactobionic acid and lactobionate salts, as well as galactooligosaccharides.

The milk protein or milk-sugar derived ingredient in the aqueous milk sourced mixture may be concentrated to the point that they represent the largest fraction (by weight) of the solids present in the mixture. Exemplary concentrations for the milk protein or milk-sugar derived ingredient in the milk-sourced mixtures may be 35% or more by dry weight. Exemplary ranges include 35%-99% by dry weight, 40%-99% by dry weight, 50%-99% by dry weight, 60%-99% by dry weight, 70-99% by dry weight, 80-99% by dry weight, 85-99% by dry weight, 90-99% by dry weight, and 95-99% by dry weight. The aqueous milk-sourced mixtures may have low concentrations of other milk solids relative to native milk (e.g., bovine milk). For example, the aqueous milk-sourced mixtures may have milk sugar (e.g., lactose) concentrations of 25 wt. % or less by dry weight (e.g., a lactose concentration of 10 wt. % or less). They may have milkfat concentrations of 25 wt. % or less (e.g., a milkfat concentration of 7 wt. % or less, of 0.5 wt. % or less). They may have mineral concentrations of 12 wt. % or less (e.g., 5 wt. % or less, 1 wt. % or less, 0.1 wt. % or less, etc.). For aqueous milk-sourced mixtures of one or more milk sugar-derived ingredients, they may have protein levels of 25 wt. % or less on a dry basis (e.g., 20 wt. % or less, 15 wt. % or less, 10 wt. % or less, 5 wt. % or less, 2 wt. % or less, 1 wt. % or less).

The aqueous milk-sourced mixture consists of water and solids. As noted above, the present methods employ evaporation techniques that can process aqueous milk-sourced mixtures with higher solids levels than is practical with conventional techniques like falling film evaporation. The aqueous milk-sourced mixtures may have a starting total solids level of at least 25 wt. %. Exemplary ranges for the total solids levels include 10 wt. % to 50 wt. %, 15 wt. % to 50 wt. %, 20 wt. % to 50 wt. %, 25 wt. % to 50 wt. %, 30 wt. % to 50 wt. %, 35 wt. % to 50 wt. %, 40 wt. % to 50 wt. %, 30 wt. % to 40 wt. %, and 35 wt. % to 40 wt. %, among other exemplary ranges. The relatively concentrated aqueous milk-sourced mixtures also have relatively high viscosities compared to, for example water (i.e., about 1 centipoise (cP) at 20° C.) or whole milk (i.e., about 2.1 cP at 20° C.). Exemplary viscosity ranges for the aqueous milk-sourced mixtures include 5 cP to 150 cP at 20° C., 8 cP to 100 cP at 20° C., 10 cP to 100 cP at 20° C., 15 cP to 100 cP at 20° C., 5 cP to 60 cP at 20° C., 8 cP to 60 cP at 20° C., 10 cP to 60 cP at 20° C., and 15 cP to 60 cP at 20° C., among other viscosity ranges.

Method 200 further includes evaporating water from the starting aqueous milk-sourced mixture 204. The evaporation process may be conducted with an evaporator chosen from a thin-film evaporator, a wiped-film evaporator, and a spinning cone evaporator, that converts the starting aqueous milk-sourced mixture into an evaporated milk-sourced mixture. The process can increase the total solids level of the starting aqueous milk-sourced mixture by at least 10%. For starting aqueous milk-sourced mixtures with lower total solids levels (e.g., 10-20 wt. % TS), the increase in the total solids level for the evaporated milk-sourced mixture can be 100% or more (e.g., converting a 10 wt. % TS starting mixture to a 35 wt. % TS evaporated mixture). Exemplary total solids levels for evaporated milk-sourced mixtures include at least 20 wt. %, at least 25 wt. %, at least 30 wt. %, at least 35 wt. %, at least 40 wt. %, at least 45 wt. %, and at least 50 wt. %. Exemplary ranges for the total solids levels in the evaporated milk-sourced mixture include 20 wt. % to 60 wt. %, 25 wt. % to 60 wt. %, 30 wt. % to 60 wt. % 35 wt. % to 60 wt. %, 40 wt. % to 60 wt. %, 45 wt. % to 60 wt. %, 50 wt. % to 60 wt. %, 30 wt. % to 50 wt. %, and 30 wt. % to 40 wt. %, among other exemplary ranges. The evaporated aqueous milk-sourced mixtures also have higher viscosities than the starting aqueous milk-sourced mixtures. Exemplary viscosities of the evaporated milk-sourced mixtures are 300 cP or more at 20° C. Exemplary viscosity ranges for the evaporated milk-sourced mixtures include 300 cP to 10,000 cP at 20° C., 2000 cP to 10,000 cP at 20° C., 3000 cP to 10,000 cP at 20° C., 3000 cP to 8000 cP at 20° C., and 2000 cP to 5000 cP at 20° C., among other viscosity ranges.

The evaporated aqueous milk-sourced mixture is then dried to form the powdered milk-derived product 206. As noted above, the drying process includes hot gas atomization drying that simultaneously atomizes the milk-sourced mixture as well as removes most of the remaining water. The powdered milk-derived product produced by the drying process may have 6 wt. % water or less, 5.5 wt. % water or less, 4 wt. % water or less, and 3 wt. % water or less. The powdered milk-derived product may have a bulk density ranging from 0.3 g/ml to 0.8 g/ml, 0.33 g/ml to 0.65 g/ml, 0.3 g/ml to 0.45 g/ml, and 0.6 g/ml to 0.65 g/ml, among other exemplary ranges. The powdered milk-derived product may have an angle of repose ranging from 5° to 40°, 10° to 37°, 10° to 30°, 15° to 30°, and 9° to 10°, among other ranges. The powdered milk-derived product may have an exemplary particle size distribution d(0.1)/d(0.5)/d(0.9) of 50-100 μm/150-300 μm/400-600 μm, 40-70 μm/120-200 μm/350-500 μm, among other exemplary ranges. The powdered milk-derived products may have an average wall thickness ranging from about 3 μm or more, about 5 μm or more, about 7 μm or more, about 10 μm or more, among other ranges. Exemplary ranges for the average wall thickness can also include about 3 μm to about 25 μm, about 5 μm to about 25 μm, 7 μm to about 25 μm, and 10 μm to about 25 μm, among other ranges.

As noted above, hot gas atomization drying includes contacting a heated drying gas with a feed of the evaporated aqueous milk-sourced mixture. The temperature and time for which the heated drying gas contacts the feed may be adjusted to reduce the denaturation of the milk proteins. Lower temperatures and shorter contact times normally decrease the percentage of milk proteins that are thermally denatured due to the drying process. For example, the temperature of the heated drying gas may be set to produce a powdered milk product with less than 25 wt. %, 20 wt. %, 15 wt. %, 10 wt. %, 5 wt. %, or 1 wt. % thermally denatured proteins. On the other hand, higher temperatures and longer contact times normally reduce the percentage of water removed from the milk proteins. Exemplary temperatures and contact times for the heated drying gas may be set to produce powdered milk-derived products having 6 wt. % to 5.5 wt. % water, 5.5 wt. % to 4 wt. % water, 4 wt. % to 3 wt. % water, or 3 wt. % to 2 wt. % water, among other water ranges.

The powdered milk product atomized by the heated drying gas may fall to the bottom of hot gas atomization drying unit for collection 208. Exemplary collection techniques include vacuum collection, cyclonic collection, and bagging, among other techniques. The collected powdered milk product may be packaged and shipped to an end user, or supplied directly as an ingredient in another food or beverage making process.

Experimental

Energy Efficiency Comparisons for TFE/HGAD and FFE/SD Methods and Systems

Experiments were run to compare the energy efficiencies of four combinations of tandem evaporator and drying methods to produce various kinds of milk protein powders. The four combinations were: (i) falling-film evaporation (FFE) and spray drying (SD), (ii) thin-film evaporation (TFE) and SD, (iii) FFE and hot gas atomization drying (HGAD), and (iv) TFE and HGAD. The efficiency of each combination was measured as the energy required (in Mbtu) to remove one pound of water from the aqueous milk-sourced mixture. These efficiency tests were conducted on four different kinds of milk protein powders: (i) reduced-lactose non-fat dry milk (NFDM), (ii) 80 wt. % whey protein concentrate (WPC-80), (iii) 90 wt. % whey protein isolate (WPI), (iv) micellar casein (MCC), and whey protein phospholipid concentrate (WPPC).

The tests start by introducing an aqueous mixture to the evaporation unit (FFE or TFE) to evaporate water and concentrate the solids present in the mixture. For the reduced-lactose NFDM, WPC-80, and WPI, the starting aqueous mixture was already loaded to at least 30 wt. % total solids before evaporation. Due to the heat sensitive nature of these products they can quickly clog the FFE equipment, so no evaporates were generated and the starting aqueous mixture proceeded to the drying stage. In the case of the MCC that started with 13 wt. % total solids, the FFE equipment was able to generate an evaporated MCC product with and increased total solids level of 24 wt. %.

The evaporates of the aqueous protein mixtures, or the starting mixtures in the case of some FFE combinations, were then dried to 95 wt. % total solids (i.e., 5 wt. % water) using either SD or HGAD. The energy needed to remove the water at each stage, as well as the amount of water removed, were summed and divided to calculate an efficiency (in Mbtu/lb water) for each combination studied. The efficiency measurements were then normalized against the FFE and SD combination to calculate a percentage gain in efficiency for the other combinations. The results are summarized in Table 1 below:

TABLE 1

Efficiency Comparisons for Four Combinations of Evaporation and Drying Techniques

| | Evaporation | | | | Drying | | | | Total | |
|---|---|---|---|---|---|---|---|---|---|---|
| Scenario | Total solids in [%] | Total solids out [%] | Water removed [lb] | Energy use [Mbtu] | Total solids in [%] | Total solids out [%] | Water removed [lb] | Energy use [Mbtu] | Total energy use [Mbtu/lb fed] | Efficiency gain over FEE + SD [%] |
| Reduced lactose NFDM example, 1 lb basis | | | | | | | | | | |
| FFE + SD | Unable to evaporate via falling film | | | | 30 | 95 | 0.65 | 1.10 | 1.10 | 0.0 |
| TFE + SD | 30 | 42 | 0.12 | 0.06 | 42 | 95 | 0.53 | 0.90 | 0.96 | 15.0 |
| FFE + HGAD | Unable to evaporate via falling film | | | | 30 | 95 | 0.65 | 0.88 | 0.88 | 25.4 |
| TFE + HGAD | 30 | 52 | 0.22 | 0.11 | 52 | 95 | 0.43 | 0.58 | 0.69 | 59.4 |
| WPC80 example, 1 lb basis | | | | | | | | | | |
| FFE + SD | Unable to evaporate via falling film | | | | 35 | 95 | 0.6 | 1.02 | 1.02 | 0.0 |
| TFE + SD | 35 | 40 | 0.05 | 0.03 | 40 | 95 | 0.55 | 0.93 | 0.96 | 6.2 |
| FFE + HGAD | Unable to evaporate via falling film | | | | 35 | 95 | 0.6 | 0.81 | 0.81 | 25.4 |
| TFE + HGAD | 35 | 50 | 0.15 | 0.08 | 50 | 95 | 0.45 | 0.61 | 0.68 | 48.9 |
| WPI example, 1 lb basis | | | | | | | | | | |
| FFE + SD | Unable to evaporate via falling film | | | | 32 | 95 | 0.63 | 1.07 | 1.07 | 0.0 |
| TFE + SD | 32 | 42 | 0.1 | 0.05 | 42 | 95 | 0.53 | 0.90 | 0.95 | 12.6 |
| FFE + HGAD | Unable to evaporate via falling film | | | | 32 | 95 | 0.63 | 0.85 | 0.85 | 25.4 |
| TFE + HGAD | 32 | 48 | 0.16 | 0.08 | 48 | 95 | 0.47 | 0.64 | 0.72 | 49.3 |
| MCC example, 1 lb basis | | | | | | | | | | |
| FFE + SD | 13 | 24 | 0.11 | 0.06 | 24 | 95 | 0.71 | 1.20 | 1.26 | 0.0 |
| TFE + SD | 13 | 24 | 0.11 | 0.06 | 24 | 95 | 0.71 | 1.20 | 1.26 | 0.0 |
| FFE + HGAD | 13 | 24 | 0.11 | 0.06 | 24 | 95 | 0.71 | 0.96 | 1.01 | 24.0 |
| TFE + HGAD | 13 | 30 | 0.17 | 0.09 | 30 | 95 | 0.65 | 0.88 | 0.96 | 30.6 |
| WPPC example, 1 lb basis | | | | | | | | | | |
| FFE + SD | Unable to evaporate via falling film | | | | 23 | 95 | 0.72 | 1.22 | 1.22 | 0.0 |
| TFE + SD | 23 | 28 | 0.05 | 0.03 | 28 | 95 | 0.67 | 1.14 | 1.16 | 5.1 |
| FFE + HGAD | Unable to evaporate via falling film | | | | 23 | 95 | 0.72 | 0.97 | 0.97 | 25.4 |
| TFE + HGAD | 23 | 37 | 0.14 | 0.07 | 37 | 95 | 0.58 | 0.78 | 0.85 | 42.9 |

All five types of milk-sourced mixtures had the largest efficiency gains for the combination of TFE and HGAD. This may be explained at least in part by the fact that a greater portion of the water removal is done in the evaporation stage by TFE+HGAD than for any other combination. It's more energy efficient to remove water by evaporation than spray or hot gas atomization drying, so shifting more water removal to the TFE stage results in the largest efficiency gains. Similar percentages of water removal are not possible with FFE because the aqueous protein mixture starts or becomes too concentrated for the FFE equipment. As a practical cutoff, aqueous protein mixtures concentrated to more than 30 wt. % to 35 wt. % total solids are not suitable for further water removal by conventional FFE equipment. For some types of purified milk-sourced mixtures, the cutoff drops to 23 wt. % total solids.

Conventional FFE and SD equipment are limited in the protein mixture total solids they can process due to viscosity. The viscosity of mixtures over 35% total solids is too high and will foul FFE equipment. TFE is capable of handling higher viscosity protein mixtures without fouling and therefore able to remove more water than FFE. Similarly, the total solids of protein mixtures feeding a spray dryer is limited due viscosity. Traditional SD equipment does not sufficiently atomize protein mixtures that have a viscosity >300 cP resulting in poor powder quality. HGAD equipment is capable of atomizing higher viscosity concentrated protein mixtures. Therefore, the combination of TFE and HGAD is a more efficient process than conventional FFE and SD as it allows for more water removal via evaporation. Viscosity ranges for TFE-generated, milk-derived protein concentrates are summarized in Table 2:

TABLE 2

Viscosity Ranges for TFE-Generated Milk-Derived Concentrates

| Product mixture concentrate | Viscosity [cP] at 20° C. |
|---|---|
| Reduced Lactose NFDM | 300 to 10,000 |
| WPC80 | 300-9300 |
| WPI | 300-10,000 |
| MCC | 300-9300 |
| WPPC | 300-5000 |
| Galactooligosaccharide | 300-2000 |

Powdered Milk Product Comparisons for TFE/HGAD and FFE/SD Methods and Systems

In addition to the efficiency gains when making powdered milk-derived products using the present methods and system, significant improvements in the quality of the products have been discovered. Specifically, the powdered milk-derived products made by the present TFE/HGAD methods and systems have higher bulk densities associated with un-agglomerated, regular milk powders while at the same time have improved pourability and particle sized distributions associated with agglomerated milk powders.

Powdered milk-derived products can be functionally described as either (i) regular (i.e., un-agglomerated) powders or (ii) agglomerated powders. While the compositions of both types of powders may be the same, a regular powder has little or no agglomeration of the constituent particles which make up the powder. In contrast, an agglomerated powder has significant agglomeration of its constituent particles into agglomerated clusters or clumps with physical dimensions such as diameter, surface area, and volume, that are larger than the constituent particles. Agglomerated powders normally have lower bulk density, greater wettability, and greater solubility in water than a regular powder made of the same milk product.

The experimental analysis of powdered milk-derived products below show that the powders made using the present TFE/HGAD methods and systems had higher bulk densities and larger particle size distributions than powders of the same composition that were made using conventional SD methods. After presenting the experimental results below, the reasons for this anomalous correlation will be discussed.

Bulk Density and Angle of Repose Comparisons for TFE/HGAD and SD Methods and Systems Additional experiments were run to compare the bulk densities and angle of repose for (i) the TFE/HGAD system, and (ii) a conventional system using spray drying (SD). The comparisons were done for three types of powdered milk-derived products: 80 wt. % whey protein concentrate (WPC80), reduced-lactose NFDM, and galactooligosaccharides (GOS). The results are shown in Table 3 below:

TABLE 3

Bulk Density and Angle of Repose for TFE/HGAD and SD-Produced Powdered Milk-Derived Products

| | WPC80 | | Reduced-Lactose NFDM | | GOS | |
|---|---|---|---|---|---|---|
| | Bulk density [g/mL] | Angle of repose [degrees] | Bulk density [g/mL] | Angle of repose [degrees] | Bulk density [g/mL] | Angle of repose [degrees] |
| SD | 0.25 | 42 | 0.45 | 17 | 0.57 | 29 |
| TFE/HGAD | 0.33-0.43 | 18-37 | 0.62-0.69 | 8-10 | 0.63-0.70 | 9-19 |

Particle Size Comparisons for TFE/HGAD and SD Methods and Systems

Additional experiments were run to compare the powder particle size of powdered milk-derived products made using (i) the TFE/HGAD system, and (ii) a conventional system using spray drying (SD). Measurements of the particle size distributions of the products included:

(i) d(0.5) (a.k.a., "D50"), which is the particle diameter where 50% of the sample's mass includes particles of that size or smaller;

(ii) d(0.9) (a.k.a., "D90"), which is the particle diameter where 90% of the sample's mass includes particles of that size or smaller;

$$\mathrm{span}\left(\frac{d(09) - d(0.1)}{d(0.5)}\right), \quad \text{(iii)}$$

which is a normalized measurement of the particle diameter distribution width around the mean particle diameter (i.e., d(0.5));

(iv) surface area-weighted mean diameter (a.k.a. D[3,2]), which is the ratio of the sum of the cube of the particle diameters over the sum of the square of the particle diameters $$\left(\text{i.e., } D[3, 2] = \frac{\Sigma d^3}{\Sigma d^2}\right);$$

and (v) volume-weighted mean diameter (a.k.a. D[4,3]), which is the ratio of the sum of the $4^{th}$ power of the particle diameters over the sum of the cube of the particle diameters $$\left(\text{i.e., } D[4, 2] = \frac{\Sigma d^4}{\Sigma d^3}\right).$$

The comparisons were done for two types of powdered milk-derived products: 80 wt. % whey protein concentrate (WPC80) and reduced-lactose NFDM. The results are shown in Table 4 below and FIGS. 3-6.

nesses were measured from the SEM images and the measurements are summarized in Table 5 below:

TABLE 5

Particle Wall Thickness Measurements for TFE/HGAD and Conventional SD-Produced WPC80

| Measurement | WPC80_SD | WPC80_TFE/HGAD |
|---|---|---|
| Average wall thickness (μm) | 1.2 | 14.5 |
| Wall thickness range (um) | 0.6-2.2 | 7.5-22.5 |
| Wall description | Very thin, egg-shell like with sharp cracks | Very thick |

The data above on bulk density and angle of repose (Table 3), particle size distributions (Table 4 and FIGS. 3-6), and particle wall thickness measurements (Table 5, FIGS. 7A-C, 8A-C), show that the present TFE/HGAD methods produce materially different powdered products with higher bulk density and smaller angles of repose than the same powdered products formed using conventional spray drying (SD) methods. Specifically, powdered WPC80 made by the present TFE/HGAD methods had a bulk density 1.3 to 1.7 times higher and an angle of repose that was 12% to 57% smaller than powdered WPC80 made by spray drying. The higher bulk density of the powdered WPC80 made by the present TFE/HGAD methods permits more of the powdered milk product to fit in the same volume of packaging, which increases packing efficiency, compared to powdered WPC80 made by conventional spray drying methods. The smaller angle of repose of the powdered WPC80 made by the present TFE/HGAD methods permits the powdered milk product to be poured out of the package with a greater degree of smoothness and consistency (i.e., better pourability) than powdered WPC80 made by conventional spray drying methods.

Similar results are demonstrated for reduced-lactose NFDM: Table 3 shows that the present TFE/HGAD methods produce powdered reduced-lactose NFDM having a bulk density about 1.5 times higher and an angle of repose about 50% smaller than powdered reduced-lactose NFDM made by conventional spray drying methods. Like the powdered WPC80, the present methods produce a powdered reduced-

TABLE 4

Particle Size Distributions for TFE/HGAD and Conventional SD-Produced Powdered Milk-Derived Products

| | WPC80 | | | | | Reduced lactose NFDM | | | | |
|---|---|---|---|---|---|---|---|---|---|---|
| | d(0.5) [μm] | d(0.9) [μm] | Span | D[3, 2] [μm] | D[4, 3] [μm] | d(0.5) [μm] | d(0.9) [μm] | Span | D[3, 2] [μm] | D[4, 3] [μm] |
| SD | 84.819 | 206.701 | 2.250 | 13.571 | 99.710 | 57.192 | 117.599 | 1.685 | 15.347 | 64.032 |
| TFE/HGAD | 150.543 | 425.694 | 2.489 | 89.850 | 203.976 | 103.536 | 211.060 | 1.559 | 86.009 | 119.174 |

Particle Wall Thickness Comparisons for TFE/HGAD and SD Methods and Systems

Figure 8A:
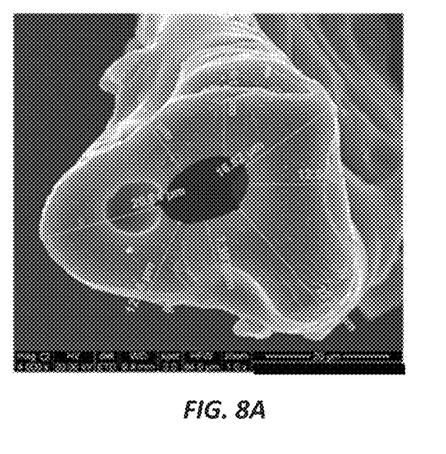
FIGS. 8A-C are SEM images of fractured WPC80 particles made according to the present TFE/HGAD methods.
Figure 8B:
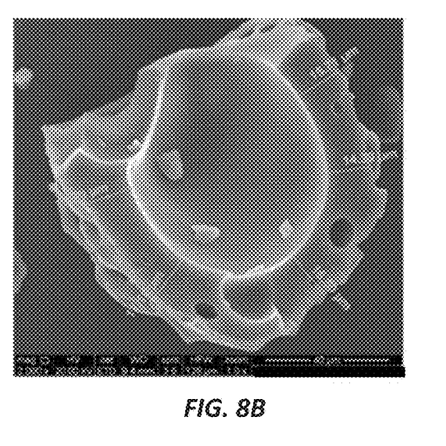
Figure 8C:
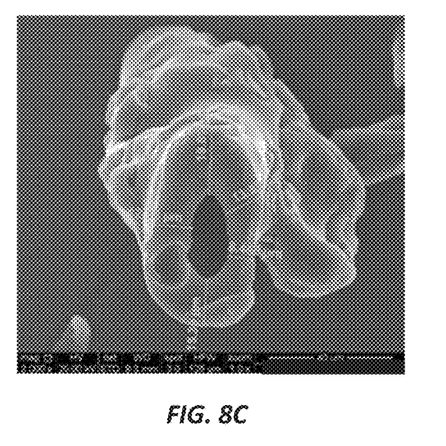

FIGS. 7A-C and 8A-C show scanning electron microscope (SEM) images that were taken of WPC80 particles of WPC80 made by conventional spray drying methods (FIGS. 7A-C) and made by the present TFE/HGAD methods (FIGS. 8A-C). The SEM images were taken of particles that had been fractured in order to expose the wall thickness of the particles. Average wall thickness and ranges of wall thick-lactose NFDM with higher packing efficiency and better pourability than the same powdered milk product made by conventional SD methods.

Similar results are demonstrated for GOS: Table 3 shows that the present TFE/HGAD methods produce powdered GOS having a bulk density about 1.3 times higher and an angle of repose about 70% smaller than powdered GOS made by conventional spray drying methods. Like the powdered WPC80, the present methods produce a powdered GOS with higher packing efficiency and better pourability than the same powdered milk product made by conventional SD methods.

The improvements in the bulk density and pourability of the powdered milk-derived products made by the present TFE/HGAD methods do not appear to be entirely attributed to particle size distribution. The powdered milk-derived products produced by both the present TFE/HGAD methods and the conventional SD methods show particle sized distributions that have both larger-sized particles and a significant fraction of smaller-sized particles: Specifically, the powdered WPC80 made by the present TFE/HGAD methods have a D50 particle size diameter (i.e., the particle diameter where 50% of the sample's mass include particles of this size or smaller) of 150.5 µm, and a D90 particle size diameter (i.e., the particle diameter where 90% of the sample's mass includes particles of this size or smaller) of 425.7 µm. Powdered WPC80 made with conventional spray drying methods had a D50 of 84.8 µm and D90 of 206.7 µm. A similar particle size distribution pattern was seen in the reduced-lactose NFDM: the powdered reduced-lactose NFDM made using the present TFE/HGAD methods had a D50 of 103.5 µm, and a D90 of 211.1 µm. The powdered reduced-lactose NFDM made using conventional spray drying methods have a D50 of 57.2 µm, and a D90 of 117.6 µm.

The larger D50 and D90 particle sizes for the WPC80 and reduced-lactose NFDM made by the present TFE/HGAD methods likely account for some of the increased bulked density and improved pourability of these powdered milk-derived products compared to products made with conventional SD methods. However, the increased bulk density seen in the powdered milk-derived products can also be attributed the significantly larger average thickness of the particle walls as measured in the SEM images. The increased wall thickness of the particles formed by the present TFE/HGAD methods and systems results in those particles having a larger amount of the more-dense product and less amount of occluded air, than particles made with the SD methods and systems. In some instances, the TFE/HGAD-produced milk particles are practically solid, while the SD-produced milk particles are primarily hollow. The replacement of less dense air in the particles with much more dense solid milk product substantially increases the overall density of the TFE/HGAD-produced milk particles compared to the SD-produced milk particles. The net result is that the present TFE/HGAD-produced powdered milk-derived products have higher bulk densities that provide more efficient packaging, while also having improved pourability characteristics compared to conventional SD-produced powdered milk-derived products.

Figure 9A:
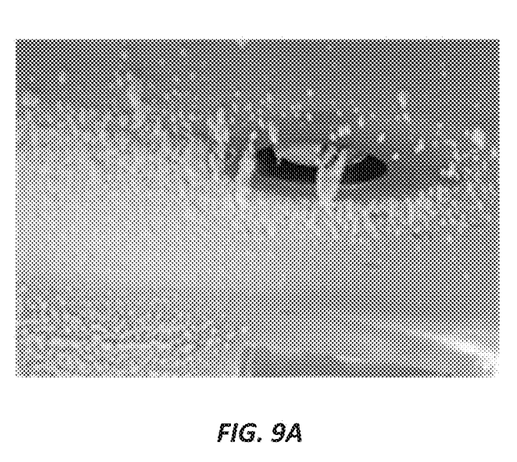
FIG. 9A is a photograph of the exterior of a nozzle with excessive product buildup (i.e., "bearding") after a conventional spray drying operation to produce a GOS powder.

Production of Galactooligosaccharides Powders Using TFE/HGAD Methods and Systems Experiments were performed to demonstrate that embodiments of the present TFE/HGAD methods and systems can produce a galactooligosaccharide (GOS) powdered product without a drying agent and the product accumulating around the nozzle surfaces in the TFE/HGAD systems. In many conventional spray drying (SD) systems and methods, GOS quickly accumulates around the surfaces of the spray dry nozzle to produce material buildup referred to as "bearding." FIG. 9A shows the exterior of a nozzle with excessive product buildup (i.e., "bearding") after a conventional spray drying operation to produce a GOS powder. This GOS product buildup around the nozzle occurred while the conventional SD system produced a relatively dry GOS powder characterized by a moisture content of 1.5-2 wt. %. Not only does bearding require more downtime for cleaning the system, excessive bearding of the combustive GOS product can create dangerous fires in the spray drying chamber.

Figure 9B:
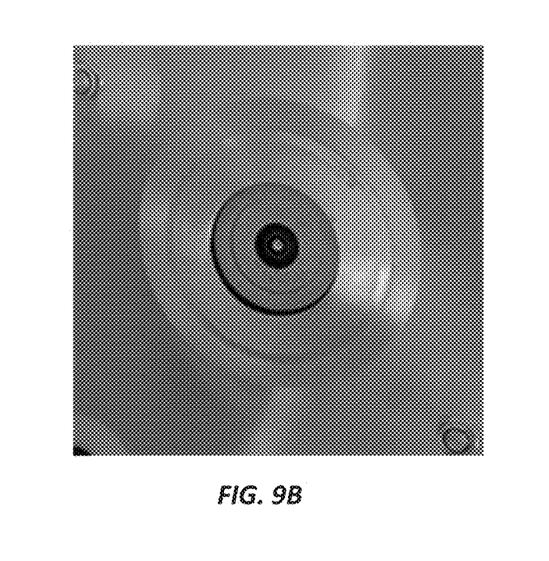
FIG. 9B is a photograph of the exterior of a nozzle after production of a GOS powder according to embodiments of the present systems and methods.

In contrast, FIG. 9B shows the unfouled exterior surface around the nozzle of an TFE/HGAD system after producing a GOS powder according to an embodiment of the present systems and methods. Not only did the embodiment avoid the bearding problem shown in FIG. 9A for the conventional SD system, bearding was absent while the present system produced a GOS powder with a significantly higher 4-6 wt. % moisture content. Thus, embodiments of the present systems and methods can produce a powdered GOS product without the bearding problems seen in conventional SD systems even when the products have moisture contents greater than or about 6 wt. %.

The avoidance of bearding of the GOS product around the present TFE/HGAD nozzles in embodiments of the present systems and methods also permits the use of GOS feedstocks that have not been pre-treated to prevent bearding. These pre-treatments used for producing GOS powders with conventional SD systems and methods may involve reducing the concentrations of glucose and galactose which are believed to contribute to the stickiness of the GOS feedstock, and/or the viscosity of the feedstock. In many untreated GOS feedstocks, glucose concentrations up to about 20 wt. %, and galactose concentrations up to about 2 wt. %, are typical. Untreated GOS feedstocks emerging from an evaporator unit also typically have, for example, a total solids concentration of about 75 wt. % and a viscosity of greater than or about 2000 cP at 23° C. For most conventional SD systems and methods, GOS feedstocks with significantly lower glucose, galactose, and significantly lower viscosity (e.g., less than or about 300 cP at room temperature) are recommended to avoid bearding problems.

The pre-treatments may also include the addition of a drying agent such as maltodextrin to the GOS feedstock to increase the glass transition temperature of the mixture. Mixtures with lower glass transition temperatures are more sticky and clumpy than mixtures with higher glass transition temperatures. While the addition of maltodextrin may increase the glass transition temperature of the feedstock and reduce the growth rate of the bearding, the powdered GOS product has a lower concentration of GOS and large amounts of the high-calorie, non-probiotic maltodextrin. Another pre-treatment technique is to use filtration and/or chromatography to reduce the concentration of glucose and galactose to less than or about 6 wt % in the GOS feedstock. While these purification techniques reduce the glucose and galactose concentration in the GOS feedstock, they also add significant cost and complexity to the methods of making a powdered GOS product. An additional pre-treatment technique is to heat the GOS feedstock to reduce the viscosity to less than or about 300 cP at 25° C. This also increases the cost and complexity of making the GOS feedstock. Embodiments of the present systems and methods make powdered GOS products from GOS feedstocks without these and other types of pre-treatment operations required by conventional SD systems and methods to avoid bearding and other problems.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of making a powdered milk product, the method comprising:
   providing an aqueous milk-sourced mixture;
   evaporating water from the aqueous milk-sourced mixture with a wiped-film evaporator to produce an evaporated milk-sourced mixture having a total solids concentration of 35 wt. % or more; and
   heating an atomization gas to a temperature of 400° F. to 1000° F.;
   contacting the evaporated milk-sourced mixture with the heated atomization gas in a drying chamber to dry and atomize the evaporated milk-sourced mixture and wherein drying and atomizing the evaporated milk-sourced mixture forms the powdered milk product, wherein the powdered milk product has less than 6 wt. % water, a bulk density of 0.3 g/mL to 0.8 g/mL, and an angle of repose ranging from 5° to 40°, wherein the powdered milk product is selected from the group consisting of whey protein concentrate, whey protein isolate, micellar casein, one or more galactooligosaccharides, and one or more aldobionate products.

2. The method of claim 1, wherein the milk-sourced mixture comprises at least one milk-derived protein.

3. The method of claim 1, wherein the milk-sourced mixture includes at least one ingredient selected from the group consisting of milk protein concentrate, milk protein isolate, whey protein concentrate, whey protein isolate, micellar casein, lactoferrin, alpha-lactalbumin, beta-lactoglobulin, immunoglobulins, whey protein phospholipid concentrate, and reduced-lactose non-fat milk.

4. The method of claim 3, wherein the milk-sourced mixture has a lactose concentration of 10 wt. % or less on a dry basis.

5. The method of claim 3, wherein the milk-sourced mixture has a milkfat concentration of 25 wt. % or less on a dry basis.

6. The method of claim 3, wherein the milk-sourced mixture has a milkfat concentration of 7 wt. % or less on a dry basis.

7. The method of claim 1, wherein the milk-sourced mixture comprises a galactooligosaccharide.

8. The method of claim 1, wherein the milk-sourced mixture comprises an aldobionate compound.

9. The method of claim 8, wherein the milk-sourced mixture comprises an amount of lactose that is 25 wt. % or less on a dry basis.

10. The method of claim 8, wherein the aldobionate compound is lactobionic acid or a lactobionate salt.

11. The method of claim 10, wherein the aldobionate compound is a lactobionate salt that is selected from the group consisting of calcium lactobionate, potassium lactobionate, ammonium lactobionate, sodium lactobionate, zinc lactobionate, and iron lactobionate.

12. The method of claim 1, wherein the evaporated milk-sourced mixture has a total solids concentration of 37 wt. % to 55 wt. %.

13. The method of claim 1, wherein the powdered milk product has less than 5.5 wt. % water.

14. The method of claim 1, wherein the energy use of the method is less than 0.96 MBTU/lb of water evaporated and dried.

* * * * *